(12) United States Patent
Sharma

(10) Patent No.: US 7,502,737 B2
(45) Date of Patent: Mar. 10, 2009

(54) MULTI-PASS RECOGNITION OF SPOKEN DIALOGUE

(75) Inventor: Sangita R Sharma, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1007 days.

(21) Appl. No.: 10/178,129

(22) Filed: Jun. 24, 2002

(65) Prior Publication Data

US 2003/0236664 A1    Dec. 25, 2003

(51) Int. Cl.
    *G10L 15/00* (2006.01)
(52) U.S. Cl. ..................... 704/251
(58) Field of Classification Search ........... 704/251, 704/257, 231
    See application file for complete search history.

(56) References Cited

U.S. PATENT DOCUMENTS 5,737,489 A * 4/1998 Chou et al. ............. 704/256
6,996,519 B2 * 2/2006 Franco et al. ............ 704/9
7,016,849 B2 * 3/2006 Arnold et al. ............ 704/275
2003/0125948 A1 * 7/2003 Lyudovyk ................ 704/257

OTHER PUBLICATIONS

Hazen, Timothy J., Burianek, Theresa, Polifroni, Joseph and Seneff, Stephanie; "Recognition Confidence Scoring for Use in Speech Understanding Systems," Spoken Language Systems Group, MIT Laboratory for Computer Science, Cambridge, MA, USA.

* cited by examiner

*Primary Examiner*—Angela A Armstrong
(74) *Attorney, Agent, or Firm*—Blakely, Sokoloff, Taylor & Zafman LLP

(57) ABSTRACT

A system and method of multi-pass recognition for conversational spoken dialogue systems includes two speech recognizers: a first recognizer that implements, for example, a statistical language model (SLM) and a second recognizer that implements, for example, a grammar-based model. A word-spotting speech recognizer may be included, as may confidence estimators for each speech recognizer. The system and method provide a multi-pass approach to speech recognition, which reevaluates speech inputs to improve recognition where confidence scores returned from confidence estimators are low.

35 Claims, 3 Drawing Sheets

MULTI-PASS RECOGNITION OF SPOKEN DIALOGUE

TECHNICAL BACKGROUND

1. Technical Field

The system and method described herein relate to conversational spoken dialogue systems.

2. Discussion of the Related Art

The main components of a conventional spoken dialogue system are a speech recognizer and an understanding module. During a single operation of the system (i.e., one "recognition pass"), the speech recognizer generates a hypothesis of the words from a spoken utterance, and the understanding module interprets the intent of the spoken query; performing an associated action (such as data retrieval) based upon this interpretation. Mis-recognition by the speech recognizer can therefore result in the implementation of an undesirable or inappropriate action by the understanding module. This mis-recognition can be frustrating to the user, and is a limitation of many conventional spoken dialogue systems.

Speech recognizers typically use a language model to identify the regularities of the language in the specific domain (e.g., airline reservations, medical information, legal issues). There are two basic models for such speech recognition: a grammar-based model and a statistical language model (SLM). In a grammar-based model, specific rules are implemented such that a speech recognizer may recognize phraseology common to the domain. While this generally yields good recognition accuracy, such a model is not robust with regard to the disfluencies associated with speech. An utterance may become unrecognizable to the system when phrased in a manner for which the system is not pre-programmed. Moreover, the inclusion of a greater number of grammar rules quickly reduces the speed of the system, often rendering the system impractical to use. SLMs are typically derived from a large database and are implemented in a fast search algorithm. Yet, while SLMs may be more adept at handling speech disfluencies, they are often less accurate than grammar-based models. Thus, one is left to the trade-off between speed and accuracy.

To improve accuracy without significantly sacrificing speed, some spoken dialog systems utilize an acoustic confidence scoring mechanism that indicates a confidence level in the hypothesis generated by the speech recognizer. Based on the confidence level, an error correction mechanism may be employed (i.e., if the confidence level is sufficiently low, the error correction mechanism is triggered). One such mechanism may request the user to repeat the query, rather than risking the performance of an undesirable or inappropriate action by the system.

Most systems that employ a confidence scoring mechanism do not include any additional mechanism that might improve the confidence score. Instead, an utterance is processed through the system once; a single confidence score is generated, and no effort is made to reevaluate the utterance or hypothesis to improve the score. Furthermore, most systems do not return intelligent feedback to the user, prompting him/her as to which part of the spoken request was unclear.

In one system, a series of confidence scores are derived from the same recognition pass. These scores are generated to identify unreliable words in an utterance; thereby allowing the system to query the user for specific information. However, this system does not implement any mechanism that operates to improve any of the confidence scores if they are low. T. J. Hazen et al., "Recognition Confidence Scoring for Use in Speech Understanding Systems," *Proc. ISCA ASR2000 Tutorial and Research Workshop*, Paris (2000).

Accordingly, there is a need for a system and method for speech recognition in a spoken dialogue system that obviates, for practical purposes, the above-mentioned limitations. Such a system and method may offer high-quality speech recognition by reexamining utterances that return a low confidence score when processed through a speech recognizer.

DETAILED DESCRIPTION

Embodiments of the present invention provide a system and method for speech recognition in a spoken dialogue system. In various embodiments, the system and method implement a multi-pass approach to speech recognition that may improve recognition accuracy. These embodiments may implement an SLM of speech recognition in one recognition pass, and a grammar-based model of speech recognition in another recognition pass. This scheme may improve recognition accuracy of low confidence recognition results from a first recognition pass, thus providing an automatic recovery mechanism for the speech recognizer. As used herein, "language models" include domain-specific language models, which are language models that include information particular to a defined set of data.

Figure 1:
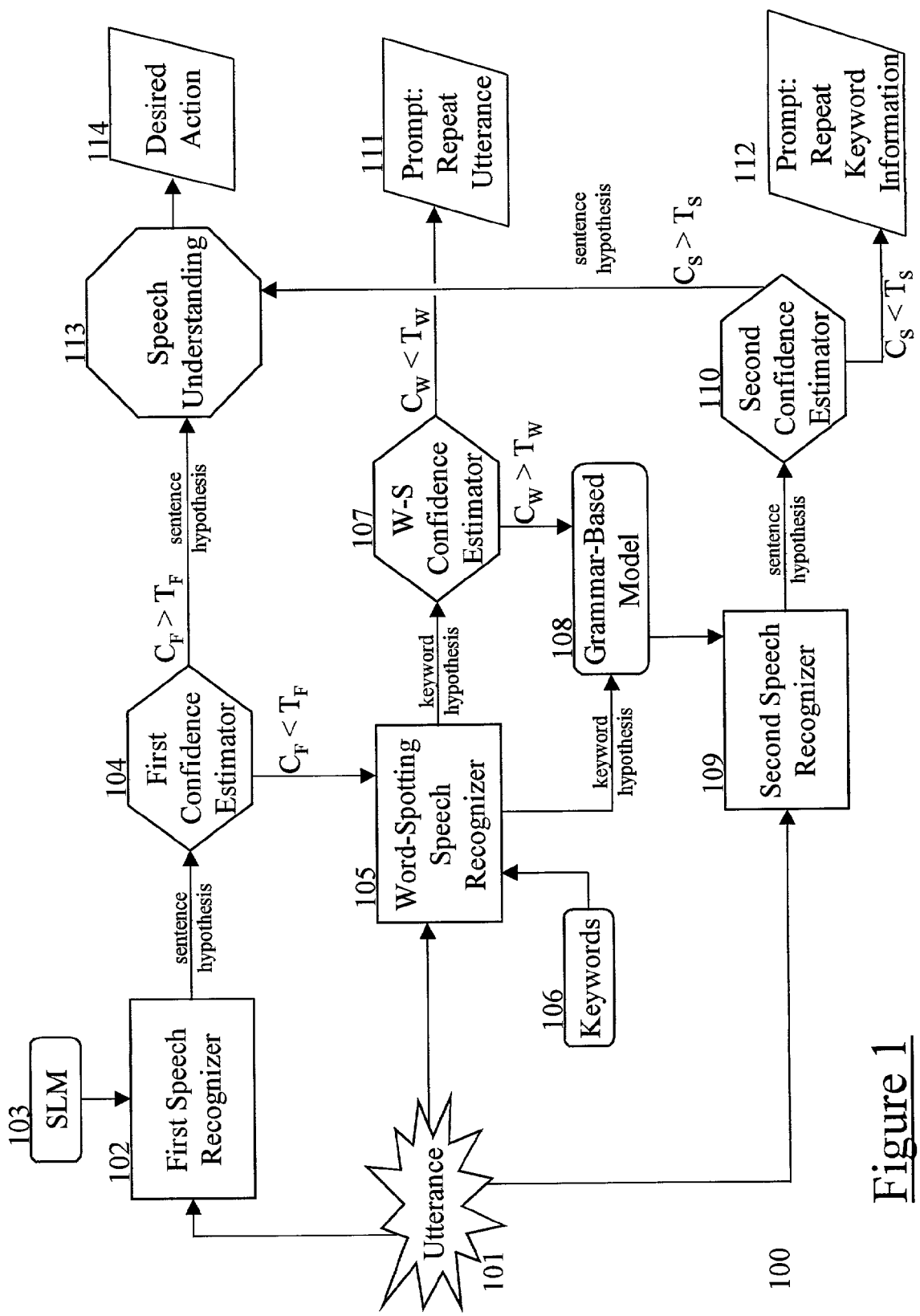
FIG. 1 depicts a schematic representation of a multi-pass spoken dialogue system in accordance with an embodiment of the present invention.

As depicted in FIG. 1, an embodiment of a multi-pass speech recognition system 100 of the present invention may include a first speech recognizer 102 and a second speech recognizer 109. The first speech recognizer 102 may implement a first recognition pass in response to a spoken utterance 101 input to the system 100 by a user. The first recognition pass may utilize a language model 103, such as an SLM or a grammar-based model, though it will be recognized by one in the art that other suitable language models may be implemented, and are contemplated as being alternate embodiments of the present invention.

The second speech recognizer 109 may similarly implement a second recognition pass in response to a spoken utterance 101 input to the system 100 by a user. The second speech recognizer 109 may utilize another language model 108 to implement a second recognition pass. The language model 108 utilized by the second speech recognizer 109 may be more constrained than the language model 103 utilized in the first speech recognizer 102. By way of example, in FIG. 1, the first speech recognizer 102 implements an SLM 103 while the second speech recognizer 109 implements a grammar-based model 108 that may be based on application-specific pre-programmed series of grammar-based rules, and may be further dynamically constrained by the keyword spotted by a word spotting speech recognizer 105. Notably, where computing system capacity allows, the first and second recognition pass may be processed in parallel, potentially reducing the overall operation time of the multi-pass system 100.

The multi-pass system 100 may further include a first confidence estimator 104 and a second confidence estimator 110;

the confidence estimators 104 and 110 generating a first confidence score $C_F$ and a second confidence score $C_S$, respectively, based upon the perceived accuracy of the first and the second recognition pass, respectively. The first and second confidence estimators 104 and 110 may each further include an associated threshold level, $T_F$ and $T_S$, respectively. The confidence score generated by a confidence estimator may be compared with its associated threshold level to determine an appropriate course of action in implementing the logic of the multi-pass recognition system 100. For instance, a confidence score at or above the threshold level may implicate speech understanding 113, while a confidence score below the threshold level may indicate that further speech analysis or a user prompt is desirable.

The multi-pass system 100 may further include a word-spotting speech recognizer 105 between the first and second speech recognizers, 102 and 109. By identifying discrete words or phrases ("keywords" 106) in an utterance, a word-spotting speech recognizer 105 may dynamically reduce the number of rules that must be searched in a second speech recognizer 109 implementing a grammar-based model 108, potentially improving system speed. For example, by providing a keyword hypothesis to a grammar-based second speech recognizer 109, the second speech recognizer 109 may focus the rules through which it searches to those terms or phrases that include the keyword. Furthermore, the word-spotting speech recognizer 105 may enable the system 100 to provide intelligent feedback to the user (e.g., prompting the user to repeat specific, unrecognizable portions 112 of the utterance 101).

The word-spotting speech recognizer 105 may further include a confidence estimator 107 that generates a confidence score $C_W$, similar to those described above with respect to the first and second speech recognizers, 102 and 109. Based upon a comparison of the confidence score $C_W$ with a threshold level $T_W$, the system 100 may determine to proceed with multi-pass speech recognition by suggesting a keyword to the second speech recognizer 109 (i.e., confidence score $C_W$ is at or above the threshold level $T_W$), or the system 100 may prompt the user to repeat the entire utterance 111 (i.e., confidence score $C_W$ is below the threshold level $T_W$).

Figure 2:
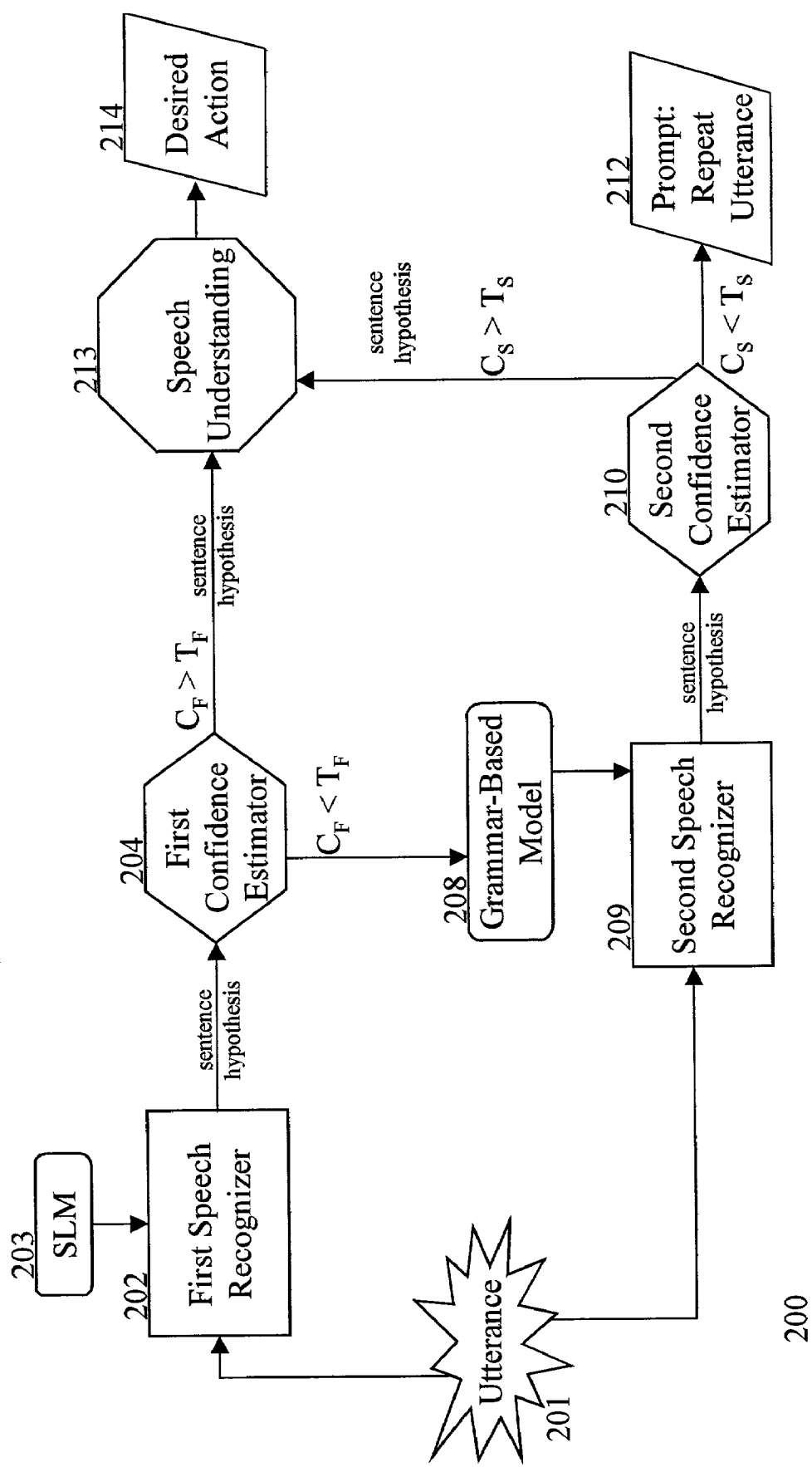
FIG. 2 depicts a schematic representation of a multi-pass spoken dialogue system in accordance with another embodiment of the present invention.

As depicted in FIG. 2, another embodiment of a multi-pass speech recognition system 200 of the present invention may include a first speech recognizer 202 and a second speech recognizer 209, similar to those described in the embodiment above (i.e., implementing a recognition pass in response to a spoken utterance 201 input to the system 200 by a user). The first and second recognition passes may each utilize language models 203 and 208, respectively, such as an SLM or a grammar-based model. Also, where computing system capacity allows, the first and second recognition pass may be processed in parallel, potentially reducing the overall operation time of the multi-pass system 200.

The multi-pass system 200 may further include first and second confidence estimators 204 and 210; the confidence estimators 204 and 210 generating a first confidence score $C_F$ and a second confidence score $C_S$, respectively, based upon the perceived accuracy of the first and the second recognition pass, respectively. The first and second confidence estimators 204 and 210 may each further include an associated threshold level, $T_F$ and $T_S$, respectively. The confidence score generated by a confidence estimator may be compared with its associated threshold level to determine an appropriate course of action in implementing the logic of the multi-pass recognition system 200. For instance, a confidence score at or above the threshold level may implicate speech understanding 213, while a confidence score below the threshold level may indicate that further speech analysis (i.e., confidence score $C_F$ is below the threshold level $T_F$) or a user prompt 212 to repeat the utterance (i.e., confidence score $C_S$ is below the threshold level $T_S$) is desirable.

Figure 3:
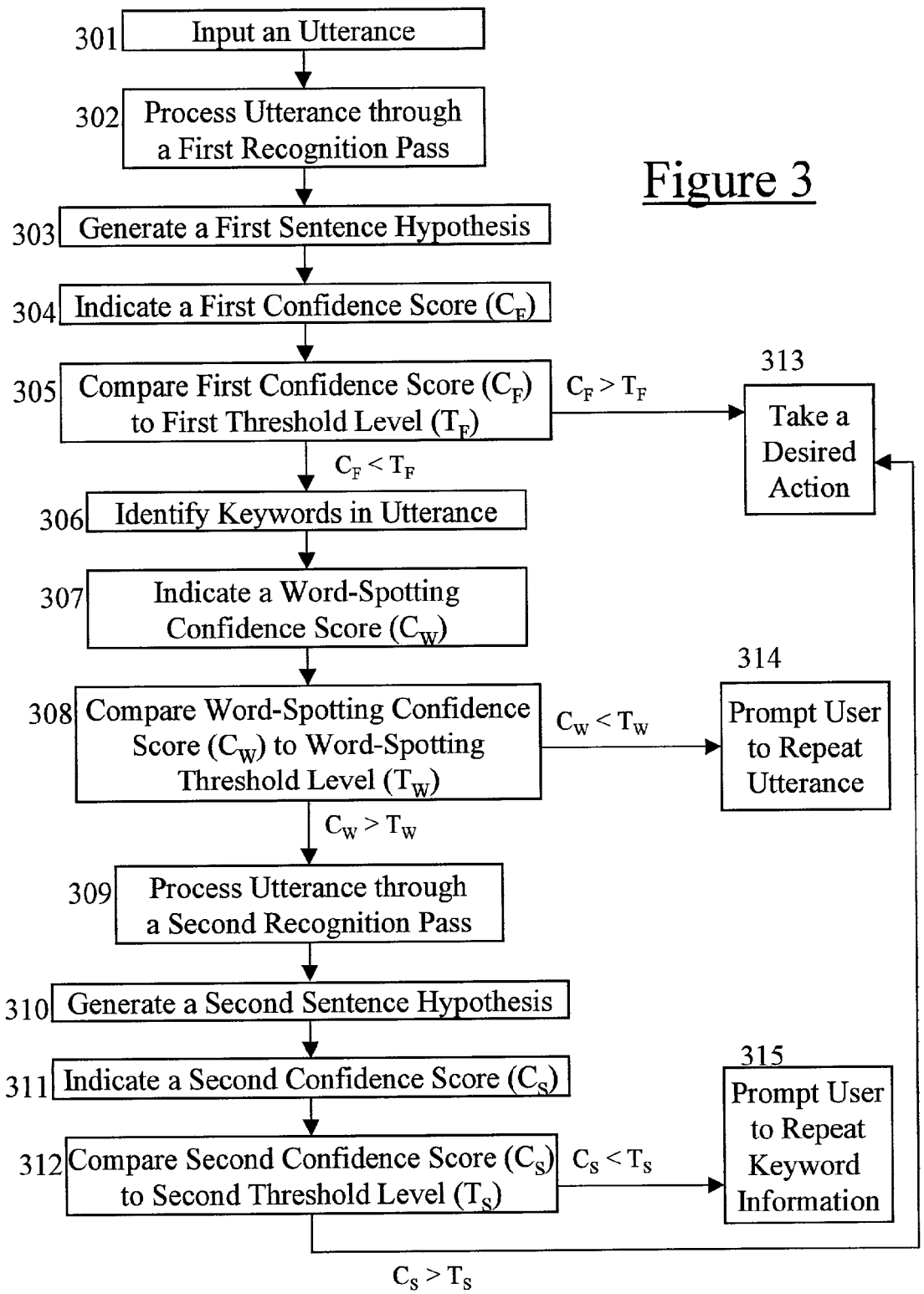
FIG. 3 depicts a flow chart representation of a multi-pass speech recognition method in accordance with an embodiment of the present invention.

In another embodiment of the present invention, as depicted in FIG. 3, a method of multi-pass speech recognition may begin with user input 301 of an utterance. The utterance may be processed 302 through a first recognition pass by a first speech recognizer, thereby generating 303 a first sentence hypothesis. A confidence score may be indicated 304 for the first sentence hypothesis, and may thereafter be compared 305 to a predetermined first threshold level. If the confidence score is at or above the first threshold level, the system may take 313 a desired action. If the score is below the first threshold level, then further analysis may ensue.

Keywords in the utterance may be identified 306 by a word-spotting speech recognizer. A confidence score may be indicated 307 for the hypothesized keyword, and may thereafter be compared 308 to a predetermined threshold level. If the confidence score is at or above the word-spotting threshold level, the keyword may be suggested to a second speech recognizer; thereby reducing the rules through which the second speech recognizer must search, where the second speech recognizer implements a grammar-based model of speech recognition. If the score is below the word-spotting threshold level, however, then the system may prompt 314 the user to repeat the entire utterance.

The utterance may be further processed 309 through a second recognition pass by a second speech recognizer, thereby generating 310 a second sentence hypothesis. A confidence score may be indicated 311 for the second sentence hypothesis, and may thereafter be compared 312 to a predetermined second threshold level. If the confidence score is at or above the second threshold level, the system may take 313 a desired action. If the score is below the second threshold level, then the system may prompt 315 the user to repeat the entire utterance or only information related to a keyword (i.e., if a word-spotting speech recognizer is included).

While the description above refers to particular embodiments of the present invention, it will be understood that many modifications may be made without departing from the spirit thereof The accompanying claims are intended to cover such modifications as would fall within the true scope and spirit of other embodiments of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A recognition system, comprising:
   a first speech recognizer to implement a first language model with an utterance from a user and to generate a first hypothesis;
   a confidence estimator to indicate a confidence score based on the first hypothesis, the confidence estimator being programmed with a threshold level;
   a second speech recognizer to implement a second language model with the utterance and to generate a second hypothesis, the second hypothesis being determinative of an outcome of the system when the confidence score is less than the threshold level;
   a word-spotting speech recognizer to identify a keyword comprised in the utterance and to generate a keyword hypothesis; and a word-spotting confidence estimator to indicate a word-spotting confidence score based on the keyword hypothesis, the word-spotting confidence estimator being programmed with a word-spotting threshold level and wherein when the word-spotting confidence score is less than the word-spotting threshold level, the system prompts the user to repeat the utterance.

2. The system of claim 1, wherein the first language model is selected from the group consisting of a statistical language model (SLM) and a grammar-based model.

3. The system of claim 1, wherein the second language model is selected from the group consisting of a statistical language model (SLM) and a grammar-based model.

4. The system of claim 1, wherein the first language model is a statistical language model (SLM) and the second language model is a grammar-based model.

5. The system of claim 1, wherein when the confidence score is greater than or equal to the threshold level, the system implements a desired action.

6. The system of claim 1, wherein the confidence estimator is a first confidence estimator, the confidence score is a first confidence score and the threshold level is a first threshold level, further comprising a second confidence estimator to indicate a second confidence score based on the second hypothesis, the second confidence estimator being programmed with a second threshold level.

7. The system of claim 6, wherein when the second confidence score is less than the second threshold level, the system prompts the user to repeat the utterance.

8. The system of claim 6, wherein when the second confidence score is greater than or equal to the second threshold level, the system implements a desired action.

9. The system of claim 6, wherein when the second confidence score is less than the second threshold level, the system prompts the user to repeat information related to the keyword.

10. The system of claim 1, wherein the keyword hypothesis is determinative of the outcome of the system when the confidence score is less than the threshold level.

11. The system of claim 1, wherein the second language model is a grammar-based model that examines a number of grammar-based rules, and the keyword hypothesis is transmitted to the second speech recognizer to reduce the number of grammar-based rules that the second speech recognizer examines during an implementation of the second language model.

12. The system of claim 1, wherein the second hypothesis is determinative of the outcome of the system when the word-spotting confidence score is greater than or equal to the word-spotting threshold level.

13. The system of claim 1, wherein the first speech recognizer and the second speech recognizer can operate in parallel.

14. A method of recognizing an utterance from a user, comprising:

processing the utterance through a first recognition pass;
generating a sentence hypothesis by an implementation of a language model during the first recognition pass;
indicating a confidence score based upon a perceived accuracy of the sentence hypothesis;
comparing the confidence score to a threshold level;
processing the utterance through a second recognition pass when the confidence score is less than the threshold level; and
wherein when the confidence score is less than the threshold level:

generating a keyword hypothesis by implementing a word-spotting recognition pass with the utterance that recognizes a keyword;
indicating a word-spotting confidence score based upon a perceived accuracy of the keyword hypothesis;
comparing the word-spotting confidence score to a word-spotting threshold level; and
prompting the user to repeat the utterance when the word-spotting confidence score is less than the word-spotting threshold level.

15. The method of claim 14, further comprising taking a desired action when the confidence score is greater than or equal to the threshold level.

16. The method of claim 14, wherein the sentence hypothesis is a first sentence hypothesis, the language model is a first language model, the confidence score is a first confidence score and the threshold level is a first threshold level, further comprising:

generating a second sentence hypothesis by an implementation of a second language model during the second recognition pass;
indicating a second confidence score based upon a perceived accuracy of the second sentence hypothesis; and
comparing the second confidence score to a second threshold level.

17. The method of claim 16, further comprising taking a desired action when the second confidence score is greater than or equal to the second threshold level.

18. The method of claim 16, further comprising prompting the user to repeat the utterance when the second confidence score is less than the second threshold level.

19. The method of claim 14, wherein processing the utterance through the second recognition pass occurs when the word-spotting confidence score is greater than the word-spotting threshold level.

20. The method of claim 14, further comprising prompting the user to repeat information related to the keyword when the second confidence score is less than the second threshold level.

21. The method of claim 14, wherein processing the utterance through the first recognition pass and processing the utterance through the second recognition pass can occur in parallel.

22. The method of claim 14, wherein the first language model is a statistical language model.

23. The method of claim 14, wherein the second language model is a grammar-based model.

24. The method of claim 14, wherein the second language model is constrained by a keyword obtained from the first language model.

25. A program code storage device, comprising:
a machine-readable storage medium; and
machine-readable program code, stored on the machine-readable storage medium, the machine-readable program code having instructions to:

process an utterance by a user through a first recognition pass,
generate a sentence hypothesis by an implementation of a language model during the first recognition pass,
indicate a confidence score based upon a perceived accuracy of the sentence hypothesis,
compare the confidence score to a threshold level,
process the utterance through a second recognition pass when the confidence score is less than the threshold level; and wherein when the confidence score is less than the threshold level, the machine-readable program code further comprises instructions to:
generate a keyword hypothesis by implementing a word-spotting recognition pass with the utterance that recognizes a keyword;
indicate a word-spotting confidence score based upon a perceived accuracy of the keyword hypothesis;
compare the word-spotting confidence score to a word-spotting threshold level; and
prompting the user to repeat the utterance when the word-spotting confidence score is less than the word-spotting threshold level.

26. The device of claim 25, wherein the machine-readable program code further comprises instructions to take a desired action when the confidence score is greater than or equal to the threshold level.

27. The device of claim 25, wherein the sentence hypothesis is a first sentence hypothesis, the language model is a first language model, the confidence score is a first confidence score and the threshold level is a first threshold level, and
wherein the machine-readable program code further comprises instructions to:
generate a second sentence hypothesis by an implementation of a second language model during the second recognition pass,
indicate a second confidence score based upon a perceived accuracy of the second sentence hypothesis, and
compare the second confidence score to a second threshold level.

28. The device of claim 27, wherein the machine-readable program code further comprises instructions to take a desired action when the second confidence score is greater than or equal to the second threshold level.

29. The device of claim 27, wherein the machine-readable program code further comprises instructions to prompt the user to repeat the utterance when the second confidence score is less than the second threshold level.

30. The device of claim 25, wherein the instruction to process the utterance through the second recognition pass issues when the word-spotting confidence score is greater than the word-spotting threshold level.

31. The device of claim 25, wherein the machine-readable program code further comprises instructions to prompt the user to repeat information related to the keyword when the second confidence score is less than the second threshold level.

32. The device of claim 25, wherein the instructions to process the utterance through the first recognition pass and process the utterance through the second recognition pass issue in parallel.

33. The device of claim 25, wherein the first language model is a statistical language model.

34. The device of claim 25, wherein the second language model is a grammar-based model.

35. The device of claim 25, wherein the second language model is constrained by a keyword obtained from the first language model.

* * * * *